Patented Sept. 15, 1953

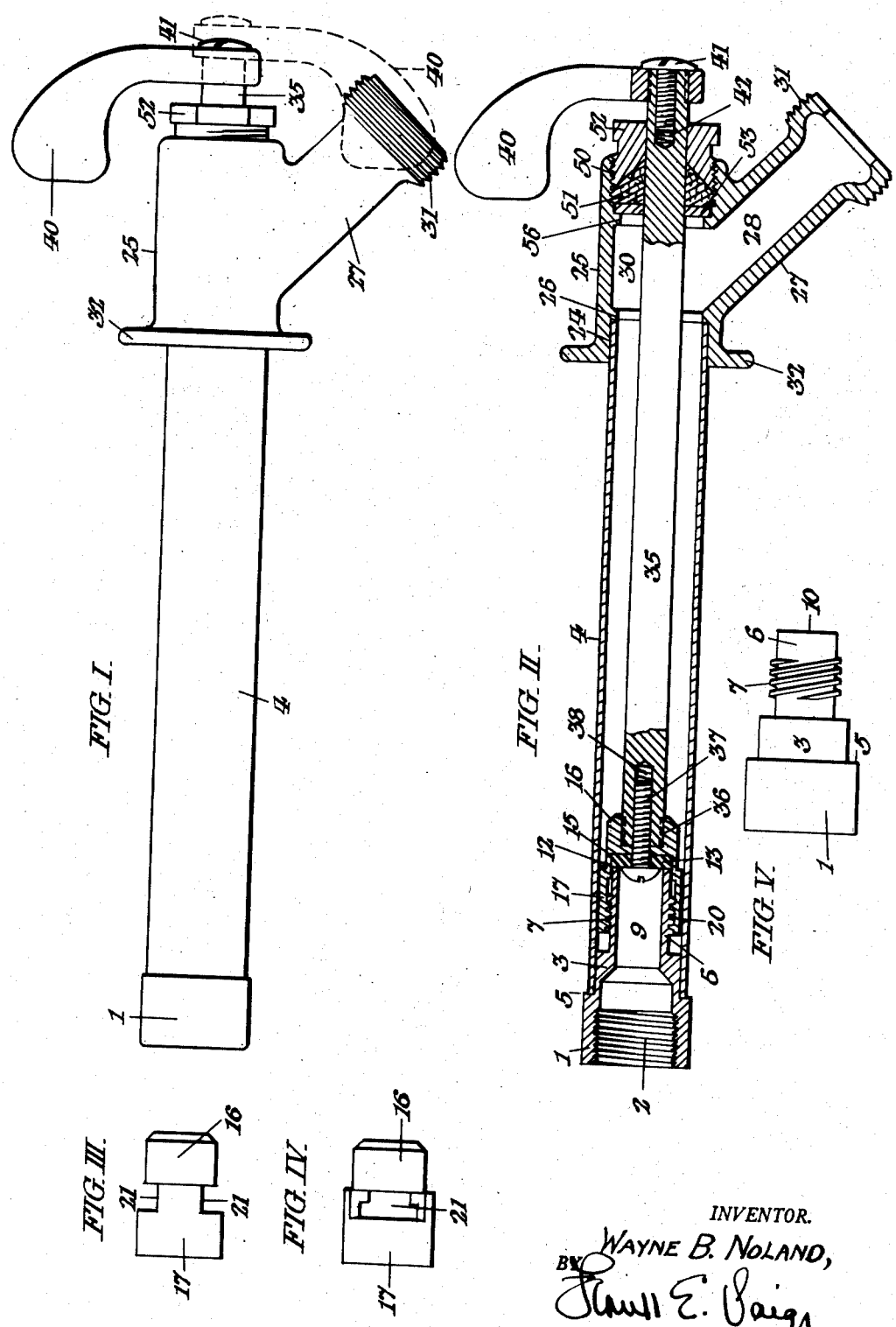

2,652,224

UNITED STATES PATENT OFFICE 2,652,224

IMPROVEMENT IN WALL HYDRANT OF THE NONFREEZING TYPE

Wayne B. Noland, Des Moines, Iowa, assignor to Woodford Hydrant Company, Des Moines, Iowa, a corporation of Iowa Application November 2, 1949, Serial No. 125,009

2 Claims. (Cl. 251—35)

My invention relates to improvement in valves, and is particularly adaptable for use in wall hydrants, or sill cocks, of the non-freezing type. Although my invention is described with particular reference to a non-freezing wall hydrant, my invention is adaptable for many other valve uses.

One feature of my invention is that the threads on the valve seat body and the valve retainer member are formed to permit the valve to be less in outside diameter than valves of ordinary construction. It is to be noted that the fluid passageway through my improved valve is equivalent ot the fluid passageway in prior art valves of the same size.

Another feature of my improved construction is that the valve is located in the protected area of a housing or basement so that the valve will not be subjected to freezing conditions outside the basement area. Hence, my invention may be used in any weather.

Another feature of my invention is that the valve may be removed readily and facilely through the head portion for repair or replacement.

Another feature of my invention is that the largest outside diameter of the barrel assembly of my valve unit is no greater than the outside diameter of the equivalent size ordinary iron pipe. Hence, my unit may be inserted as a replacement through the same hole in the basement wall as was used for the ordinary iron pipe. Such feature facilitates replacement of old-type sill cocks connected to iron pipe by my improved non-freezing type wall hydrant without the necessity of enlarging the hole through the basement wall. Experience has shown that the enlarging of such holes generally results in a damaged wall and an unsatisfactory appearance.

Another feature of my invention is that my improved valve is provided with a fast lead thread which results in quick opening of the valve on a partial turn, the opening movement being similar to that of an ordinary household faucet.

Another feature of my invention is that my construction is more compact, is lighter in weight, and has a lower material cost than equivalent size prior art valves. The decrease in weight is advantageous commercially because such valves ordinarily are shipped in small lots by parcel post or express.

My invention comprises the various novel features of construction and arrangement hereinafter more definitely specified.

Referring to said drawings:

Fig. I is an elevation of a non-freezing wall hydrant embodying my invention.

Fig. II is a longitudinal vertical sectional view of the structure shown in Fig. I.

Fig. III is an elevation of the retainer element of the valve.

Fig. IV is an elevation of the retainer element shown in Fig. III, but viewed at right angles to the position of the retainer element as shown in Fig. III.

Fig. V is an elevation of the valve seat body.

In said drawings; the valve seat body 1 is provided with an internal screw thread 2 adapted for engagement with the screw threaded end of an ordinary iron pipe, or a pipe fitting or connection. The valve seat body 1 has a reduced portion 3 over which a tubular member 4 is slip fitted or push fitted. As best shown in Fig. II, the left-hand end of the tubular member 4 abuts the shoulder 5 formed on the valve seat body 1. The valve seat body 1 and tubular member 4, conveniently, are soldered together.

The valve seat body 1 is provided with the tubular extension 6 which has a projecting external thread 7, conveniently a quadruple Acme thread. The valve seat body 1 has the fluid opening 9 extending therethrough. The outlet end 10 of the valve seat body 1 and extension 6 is provided with a valve seat 12 which is adapted to be engaged by the valve member 13 which is mounted in a recess 15 formed in the retainer member 16.

The left-hand tubular end 17 of the retainer member 16 is provided with the internal screw thread 20 adapted to engage the screw thread 7 formed on the valve seat body 1. As best shown in Figs. III and IV; the retainer member 16 is provided with slotted openings 21, which are conveniently formed by milling slots through the opposite sides of the retainer member 16. The slotted openings 21 afford fluid communication between the opening 9 in the valve seat body 1 and the tubular member 4 when the valve member 13 has been moved from closed position on its valve seat 12 to open position as hereinafter described.

As best shown in Fig. II; the right-hand end of the tubular member 4 is slip fitted or push fitted in the annular recess 24 formed in the head casting member 25. The right-hand end of the tubular member 4 abuts the annular ledge 26 formed in the head member 25, and the right-hand end of the tubular member 4 and head casting 25, conveniently, are soldered together. The head member 25 is provided with an angular neck portion 27 which has the fluid passageway 28 therethrough which is in open communication with the fluid chamber 30 of the head member 25. The outer end of the neck portion 27 is provided with the external screw thread 31 adapted to be engaged by a screw threaded coupling of a hose or other conduit which it may be desired to connect to the wall hydrant. The head member 25 conveniently is provided with the annular flange 32 adapted for engagement with the outer surface of a wall or housing through which the tubular member 4 projects.

As best shown in Fig. II; the left-hand end of the valve operating rod 35 extends into a socket recess 36 formed in the retainer member 16. The end of the rod 35 and the socket recess 36, conveniently, are splined, and the valve member 13, retainer member 16, and valve operating rod 35 are held together in rigid relationship by means of the screw 37 which extends through matching openings in the valve 13 and retainer member 16 into the screw threaded opening 38 formed in the left-hand end of the rod 35.

The operating lever, or handle, 40 is rigidly connected to the right-hand end of the rod 35, conveniently by means of the screw 41 which extends into the screw threaded opening 42 formed in the right-hand end of the rod 35. The right-hand end of the rod 35 and the rod opening through the lever handle 40 are splined to afford a convenient means for facilely adjusting the position of the lever handle 40 with respect to the head casting 25 and its angular neck portion 27.

It is to be noted that the operating handle 40 not only is of a unique design and appearance which has a good "feel" to the operator, but also is so designed that it will come into engagement with a part of the head casting 25, for example, the neck portion 27 as indicated in dotted lines in Fig. I, when the valve is at full open position. Accordingly, opening movement of the valve beyond a predetermined point, and any accidental unscrewing of the retainer member 16 from the thread 7 formed on the valve seat body 1, is prevented. It is obvious that, if desired, instead of using the neck portion 27 as an abutment, as shown, a separate abutment could be formed on the head casting 25, and used as a stop to be engaged by the handle to limit the opening movement of the valve.

The rod 35 is provided with the packing gland 50 formed in the head casting 25. Said packing gland is of ordinary construction, and includes the packing 51 and the packing gland nut 52 in screw threaded engagement in a screw threaded opening formed in the head casting 25. A washer 53 is interposed between the packing 51 and the annular ledge 56 formed in the head casting 25.

If my improved non-freezing type wall hydrant be used as a replacement for an ordinary wall hydrant, or sill cock; it is to be noted that the valve seat body 1 with attached tubular extension member 4 of my improved wall hydrant may be inserted through the same opening in the wall which was used for the ordinary iron pipe to which the old wall hydrant was connected.

In other words, the outside diameter of the valve seat body 1 and tubular extension member 4 of my improved wall hydrant of say ½" size, is no greater than the outside diameter of ½" ordinary iron pipe to which an ordinary wall hydrant is connected on the outside of a basement wall or housing. This feature is of great practical importance because the outside diameter of most prior art non-freezing type wall hydrants is considerably greater than the outside diameter of ordinary iron pipe size. Heretofore, when it has been desired to replace an ordinary wall hydrant connected to an ordinary iron pipe with one of the prior art non-freezing type wall hydrants, it has been necessary to enlarge considerably the iron pipe hole in the basement wall, or housing, before the body of any prior art non-freezing type wall hydrant could be inserted. It is well recognized and known in the art, that when such iron pipe openings through a basement wall are enlarged in order to install a non-freezing hydrant of the prior art constructions, the result rarely is anything except a botchy-looking job.

Repair or replacement of the valve member 13 of my improved wall hydrant may be effected facilely because the valve operating rod 35 with attached retainer member 16 and valve member 13 may be removed through the screw threaded opening in the head member 25. To effect repair or replacement of the valve member 13, the lever handle 40 is removed from the rod 35 after the screw 41 has been removed. The packing gland nut 52 is then unscrewed, and the screw thread 20 of the retainer member 16 unscrewed completely from the screw thread 7 on the valve seat body 1 by counterclockwise turning movement of the rod 35. When the screw thread 20 has been disengaged from the screw thread 7, the complete assembly may be removed through the packing gland opening in the head member 25.

It is obvious that various modifications may be made in my invention without departing from the essential features thereof and, therefore, I do not desire to limit myself to the precise details of construction and arrangement herein disclosed.

I claim:

1. A wall hydrant of the non-freezing type comprising a head casting member provided with a fluid discharge outlet; a tubular valve seat member having a fluid opening therethrough; a tubular fluid conduit, in concentric relation with said tubular valve seat member, connected at its outlet end to said head casting member and in communication with said fluid outlet thereof and at its inlet end to said valve seat member and in fluid communication therewith; a valve seat formed in said valve seat member at the outlet end thereof and provided with an opening therethrough; an external screw thread on said valve seat member; a non-threaded tubular extension portion between said outlet end of said valve seat member and said external screw threaded portion, said non-threaded tubular extension portion of said valve seat member being of lesser diameter than the outside diameter of said external screw thread; a tubular valve retainer member, in concentric relation with said tubular fluid conduit, provided with an internal screw thread at an enlarged diameter inlet and adapted to engage said external screw thread on said valve seat member; a valve head member in said valve retainer member adapted to engage said valve seat to open and close the opening through said valve seat member; a reduced outside diameter portion at the outlet end of said valve retainer member; a fluid opening formed in said valve retainer member at the portion thereof immediately adjacent said reduced diameter portion of said valve retainer member between the valve head member and the threaded inlet end of said valve retainer member, said fluid opening being in communication with said tubular fluid conduit; and means to actuate said valve retainer members to selectively move said valve head member to open position and to closed position on its valve seat; the internal diameter of said tubular fluid conduit being only slightly greater than the outside diameter of said valve retainer member at its enlarged diameter inlet end portion provided with the internal screw thread; whereby, when said valve head member is in open position, fluid may flow through the outlet end of the fluid opening through said valve seat member, and through the fluid opening in said valve retainer member, and through the space between the tubular fluid conduit and the concentric reduced outside diameter portion at the outlet end of the valve retainer member, and through the tubular fluid conduit to said fluid discharge outlet in said head casting member.

2. A wall hydrant of the non-freezing type comprising a head casting member provided with a fluid discharge outlet; a tubular valve seat member having a fluid opening therethrough; a tubular fluid conduit, in concentric relation with said tubular valve seat member, connected at its outlet end to said head casting member and in communication with said fluid outlet thereof and at its inlet end to said valve seat member and in fluid communication therewith; a valve seat formed in said valve seat member at the outlet end thereof and provided with an opening therethrough; an external screw thread on said valve seat member; a tubular valve retainer member, in concentric relation with said tubular fluid conduit, provided with an internal screw thread at an enlarged diameter inlet end adapted to engage said external screw thread on said valve seat member; a valve head member in said valve retainer member adapted to engage said valve seat to open and close the opening through said valve seat member; a reduced outside diameter portion at the outlet end of said valve retainer member; a fluid opening formed in said valve retainer member at the portion thereof immediately adjacent said reduced diameter portion of said valve retainer member between the valve head member and the threaded inlet end of said valve retainer member, said fluid opening being in communication with said tubular fluid conduit; and means to actuate said valve retainer member to selectively move said valve head member to open position and to closed position on its valve seat; the internal diameter of said tubular fluid conduit being only slightly greater than the outside diameter of said valve retainer member at its enlarged diameter inlet end portion provided with the internal screw thread; whereby, when said valve head member is in open position, fluid may flow through the outlet end of the fluid opening through said valve seat member, and through the fluid opening in said valve retainer member, and through the space between the tubular fluid conduit and the concentric reduced outside diameter portion at the outlet end of the valve retainer member, and through the tubular fluid conduit to said fluid discharge outlet in said head casting member.

WAYNE B. NOLAND.

References Cited in the file of this patent

UNITED STATES PATENTS

| Number | Name | Date |
| --- | --- | --- |
| 177,180 | Watkeys | May 9, 1876 |
| 464,451 | Clark | Dec. 1, 1891 |
| 657,562 | Neumeyer | Sept. 11, 1900 |
| 925,510 | Ritchie | June 22, 1909 |
| 928,047 | Harnett | July 13, 1909 |
| 955,979 | Murphy | Apr. 26, 1910 |
| 968,711 | Stevenson | Aug. 30, 1910 |
| 1,562,981 | Muend | Nov. 24, 1925 |
| 1,656,772 | Bucknell | Jan. 17, 1928 |
| 1,715,314 | Surdam | May 28, 1929 |
| 1,886,159 | Brown | Nov. 1, 1932 |
| 1,888,359 | Ritchie | Nov. 22, 1932 |